(12) United States Patent
Benedict et al.

(10) Patent No.: US 9,097,068 B2
(45) Date of Patent: Aug. 4, 2015

(54) PRESSURE COMPENSATION DEVICE FOR THREAD CONNECTIONS

(71) Applicants: Detlev Benedict, Celle (DE); Robert Buda, Lower Saxony (DE); Stephan Mueller, Hannover (DE); Rene Schulz, Lower Saxony (DE)

(72) Inventors: Detlev Benedict, Celle (DE); Robert Buda, Lower Saxony (DE); Stephan Mueller, Hannover (DE); Rene Schulz, Lower Saxony (DE)

(73) Assignee: Baker Hughes Incorporated, Houston, TX (US)

( * ) Notice: Subject to any disclaimer, the term of this patent is extended or adjusted under 35 U.S.C. 154(b) by 223 days.

(21) Appl. No.: 13/719,802

(22) Filed: Dec. 19, 2012

(65) Prior Publication Data

US 2014/0166309 A1    Jun. 19, 2014

(51) Int. Cl.
| | |
|---|---|
| *E21B 17/02* | (2006.01) |
| *E21B 17/042* | (2006.01) |
| *F16L 15/00* | (2006.01) |
| *F16L 15/08* | (2006.01) |

(52) U.S. Cl.
CPC ............ *E21B 17/042* (2013.01); *F16L 15/001* (2013.01); *F16L 15/08* (2013.01)

(58) Field of Classification Search
USPC ............................... 166/242.6, 65.1; 175/320
See application file for complete search history.

(56) References Cited

U.S. PATENT DOCUMENTS

| | | | |
|---|---|---|---|
| 4,384,737 A | 5/1983 | Reusser | |
| 7,093,654 B2 * | 8/2006 | Hall et al. | 166/242.6 |
| 7,255,183 B2 * | 8/2007 | Cramer | 175/320 |
| 7,527,105 B2 * | 5/2009 | Hall et al. | 166/380 |
| 2009/0289808 A1 | 11/2009 | Prammer | |
| 2011/0290476 A1 | 12/2011 | Steele et al. | |
| 2012/0176138 A1 | 7/2012 | Prammer | |

FOREIGN PATENT DOCUMENTS

| | | |
|---|---|---|
| EP | 0127560 B1 | 1/1990 |
| WO | 2012116983 A1 | 9/2012 |

OTHER PUBLICATIONS

International Search Report and Written Opinion for PCT Application No. PCT/US2013/074980, dated Sep. 25, 2014, pp. 1-12.

* cited by examiner

*Primary Examiner* — William P Neuder
(74) *Attorney, Agent, or Firm* — Cantor Colburn LLP

(57) ABSTRACT

A threaded tubular section includes a first tubular member made of a first material, the first tubular member including a threaded pin section. The section also includes a second tubular member made of a second material, the second tubular member including a threaded box section to mate with the threaded pin section. A pressure equalization device made of a third material is disposed between the first tubular member and the second tubular member, the pressure equalization device including one or more openings to equalize pressure in an interior of a thread connection of the first and the second tubular members with pressure in a bore or an annulus of the first and the second tubular members.

14 Claims, 5 Drawing Sheets

PRESSURE COMPENSATION DEVICE FOR THREAD CONNECTIONS

BACKGROUND

In the exploration and exploitation of downhole formations, many components (e.g., pipes, sensor and measurement tools) may be connected together to reach the depths of interest. Accordingly, many downhole components have thread connections that facilitate the joining together of the components. An apparatus and method to mitigate the pressure in the threaded joints would be appreciated in the drilling industry.

SUMMARY

According to one aspect of the invention, a threaded tubular section includes a first tubular member made of a first material, the first tubular member including a threaded pin section; a second tubular member made of a second material, the second tubular member including a threaded box section configured to mate with the threaded pin section; and a pressure equalization device made of a third material and disposed between the first tubular member and the second tubular member, the pressure equalization device including one or more openings configured to equalize pressure in an interior of a thread connection of the first and the second tubular members with pressure in a bore or an annulus of the first and the second tubular members.

According to another embodiment of the invention, a method of connecting tubular members in a borehole penetrating the earth includes selecting a first tubular member made of a first material, the first tubular member including a threaded pin section; selecting a second tubular member made of a second material, the second tubular member including a threaded box section configured to mate with the threaded pin section; and disposing a pressure equalization device made of a third material between the first tubular member and the second tubular member, the pressure equalization device including one or more openings configured to equalize pressure in an interior of a thread connection of the first and the second tubular members with pressure in a bore or an annulus of the first and the second tubular members.

BRIEF DESCRIPTION OF THE DRAWINGS

Referring now to the drawings wherein like elements are numbered alike in the several Figures.

DETAILED DESCRIPTION

As noted above, the joints formed by rotary double-shouldered threaded connections between downhole components are subject to pressure. One source of the pressure is hydrostatic pressure of the drilling mud in the bore or annulus. Another source of pressure is lubricants trapped within the threads that create pressure from within the joined components during make-up of the connection. The pressure on the joints can damage components like a shoulder ring and/or the tools being joined.

Figure 1:
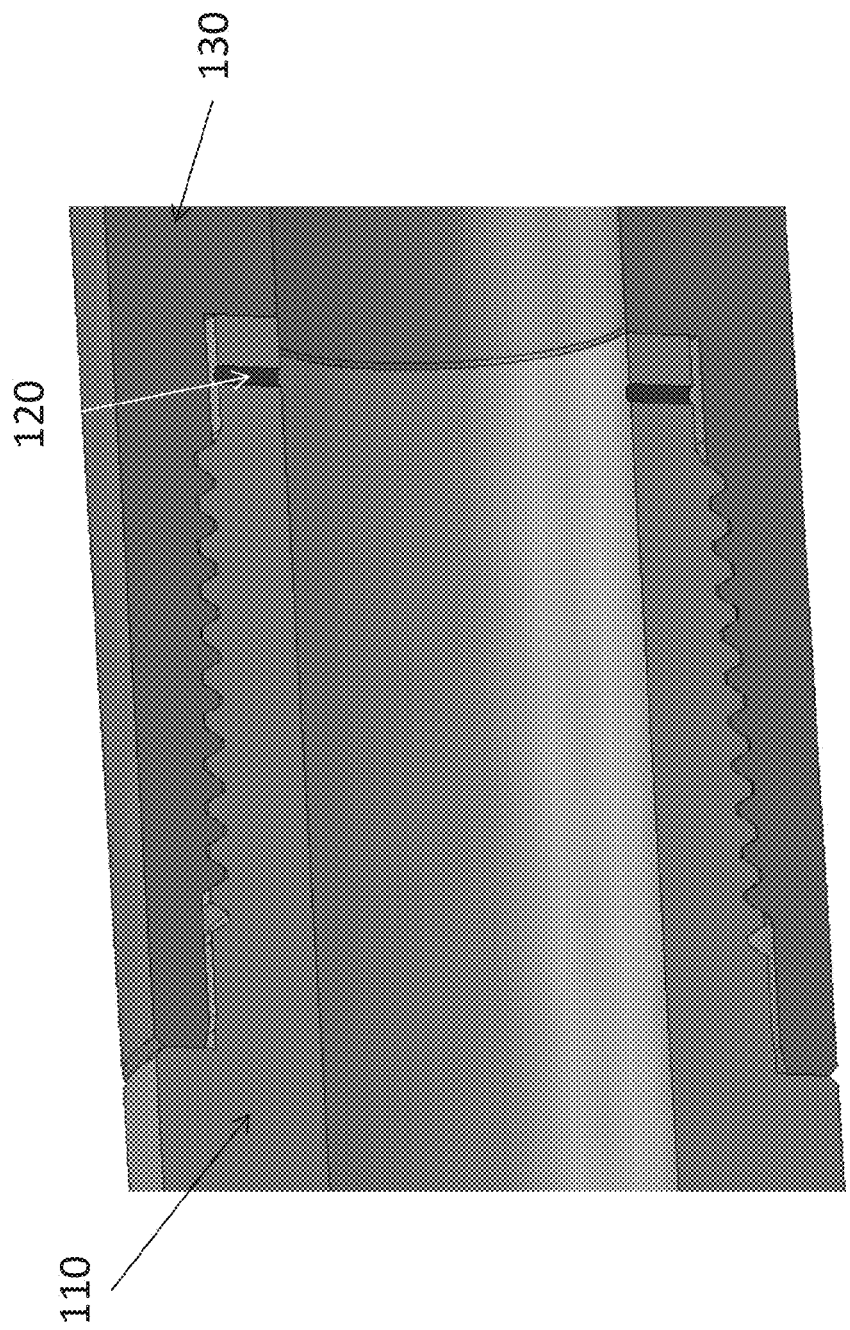
FIG. 1 illustrates a cutaway view of a previous approach to mitigating internal pressure.

FIG. 1 illustrates a cutaway view of a previous approach to mitigating internal pressure. One or more passageways 120 are formed in the threaded pin 101 at a mating surface with the threaded box 130. However, this approach presents some challenges. Because the passageways 120 are formed in the threaded pin 101 (i.e., the passageways are part of one of the two components being joined), the passageways 120 are formed in the same type of material as the threaded pin 110. This precludes the ability to use a higher strength material around the passageways 120 that will withstand greater loads like axial forces from torque and pressure than other areas. Even more significantly, the fact that the passageways 120 are part of the threaded pin 110 creates problems when the threaded pin 110 or the threaded box 130 must be recut as is sometimes required for tools used in the downhole environment. That is, the passageways 120 limit the number of times and ways of reworking the shoulder of the threaded pin 110 or the area around the passageway 120.

Figure 2:
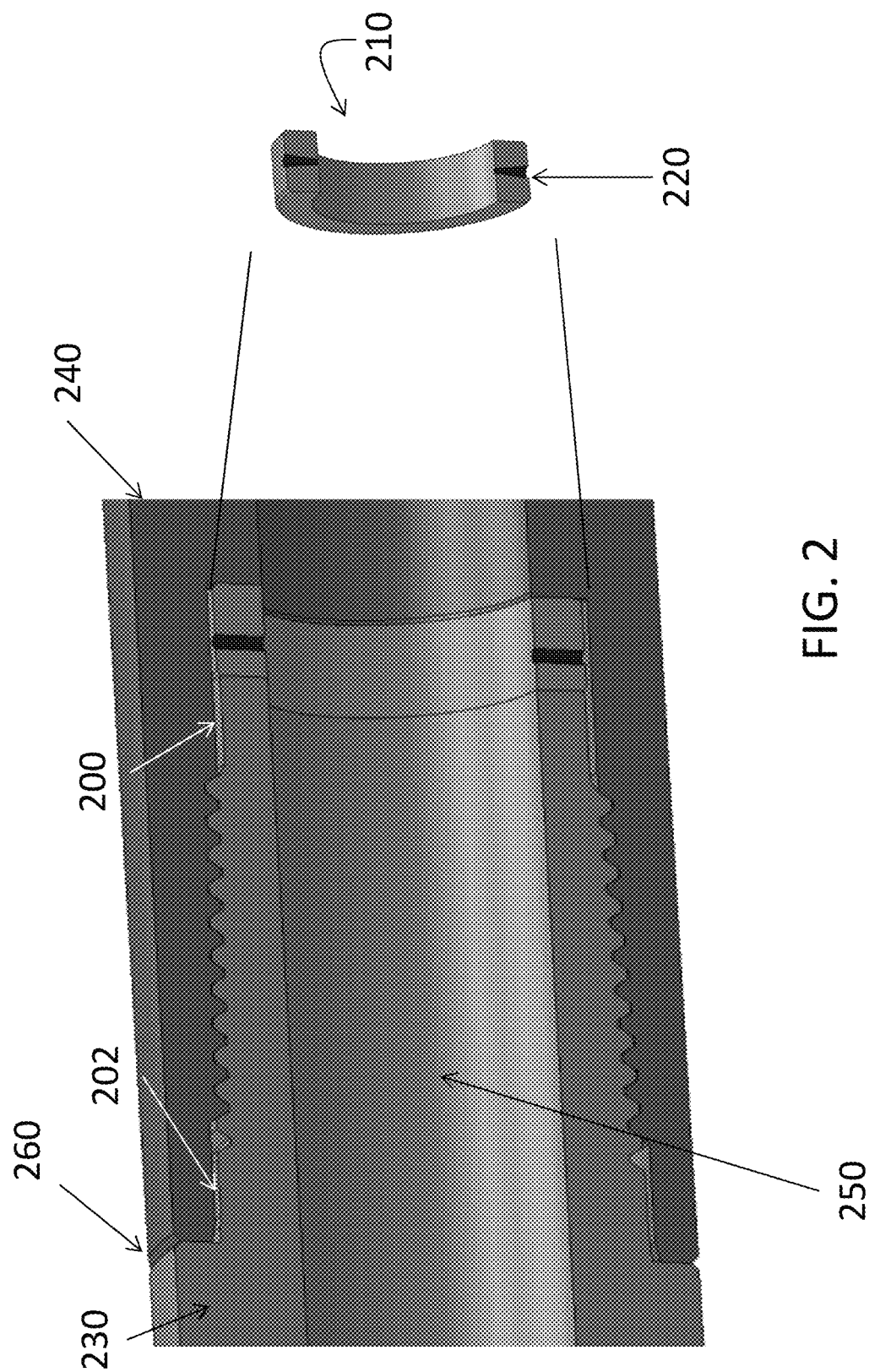
FIG. 2 illustrates a cutaway view of a threaded pipe section including a pressure equalization device according to an embodiment of the invention.

FIG. 2 illustrates a threaded tubular section including a pressure equalization device 210 according to an embodiment of the invention. The pressure equalization device 210 includes one or more openings 220 to equalize the pressure in the interior 200 of the thread connection and the bore 250. In alternate embodiments, the pressure equalization device 210 may be located at 260. In this case, the one or more openings 220 equalize pressure in the interior 202 of the thread connection and the annulus (410, FIG. 4) outside the tubular members 230, 240 (e.g., pipes, tools). The pressure may be, for example, due to hydrostatic pressure in the bore 250 or annulus 410 or may be due to grease being trapped in the interior space during connection of the tubular members 230, 240. The one or more openings 220 may be formed in any number of shapes. An opening 220 may be formed as a ring (round through hole) or, as shown in the detailed illustration in FIG. 2, the opening 220 may be tapered to prevent plugging. The tapered opening 220 may be smaller at the side expected to have higher pressure. In the embodiment shown at FIG. 2, the taper of the opening 220 is such that the opening 220 is smaller at the bore 250 (where pressure is expected to be higher) than at the interior 200. Because the pressure equalization device 210 is a separate component from either of the tubular members 230, 240, the pressure equalization device 210 may be made of a different, higher strength material, than the pipes 230, 240. For example, while a typical tool joint yield strength may be 120 ksi (according to American Petroleum Institute (API) standards), the device 210 may have a yield strength of 140-160 ksi. In addition, the device 210 may be formed from a specially treated stainless steel or Nickel-based alloy such that the device 210 is more resistant to corrosion and other environmental effects than surrounding materials. Further, by being formed as a separate component, the pressure equalization device 210 is unaffected by any recutting process that must be done on the threaded sections of the tubular members 230, 240.

Figure 3:
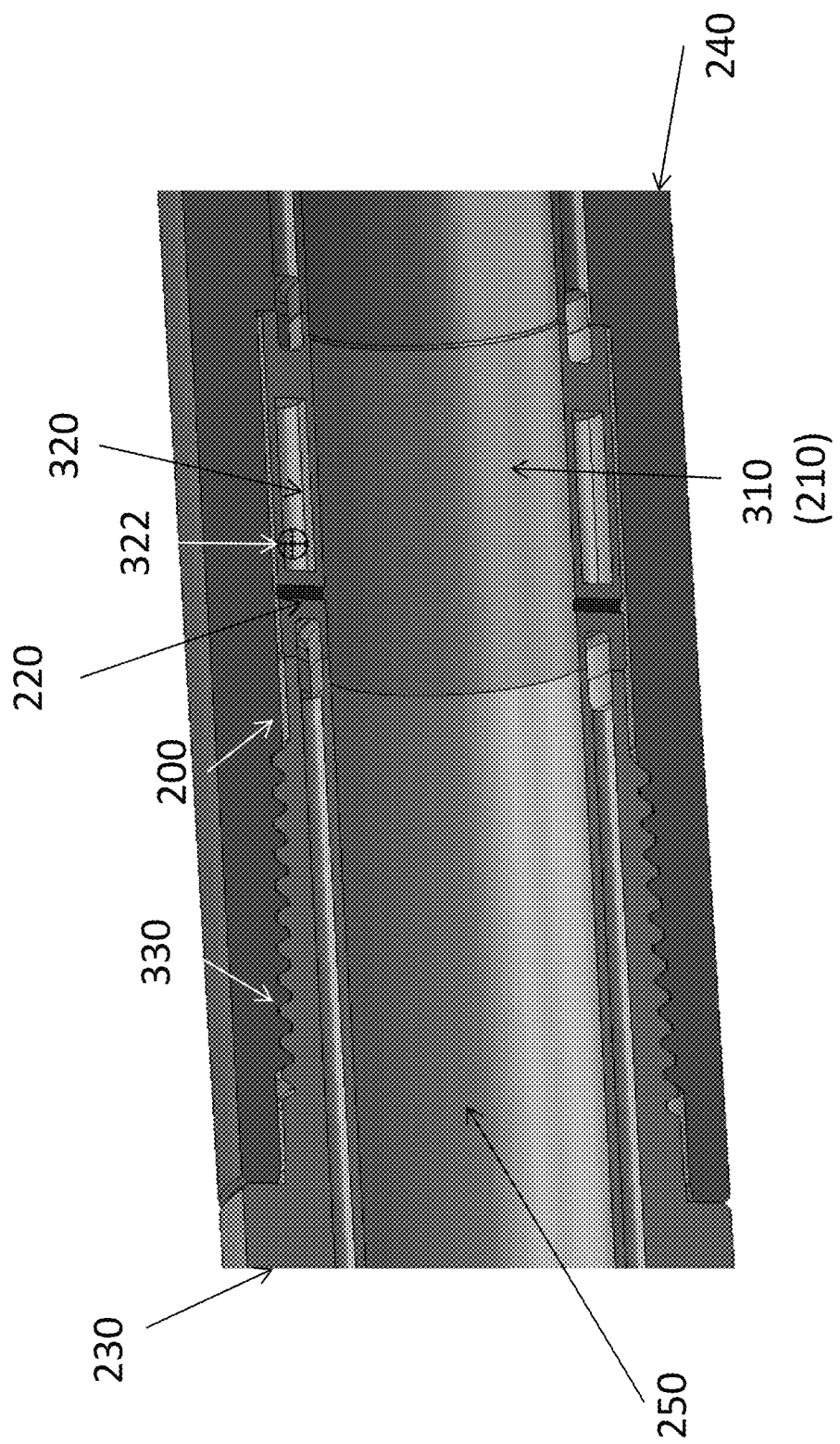
FIG. 3 illustrates a cutaway view of a threaded pipe section including a pressure equalization device according to another embodiment of the invention.

FIG. 3 illustrates a threaded tubular section including a pressure equalization device 210 according to another embodiment of the invention. In the embodiment shown in FIG. 3, the pressure equalization device 210 is a frame 310. The frame 310 may house electronic components and include a cavity 320 for a transmission line that transmits data from downhole to the surface and/or vice versa or other components associated with data gathering and transmission. The frame 310 includes one or more openings 220 to equalize pressure in the interior 200 of the thread connection and the bore 250. The tubular members 230, 240 are coupled by the threaded portion 330. As in the previous embodiment discussed with reference to FIG. 2, the frame 310 with the one or more openings 220 is a separate component from either of the tubular members 230, 240. Thus, the frame 310 material may be a different higher strength material than the material comprising the tubular members 230, 240. In addition, the frame 310 and openings 220 are unaffected by any recutting required for the threaded portion 330 or shoulders of the tubular members 230, 240.

In a wired pipe application, the device 210 according to the embodiment shown in FIG. 2, as well as the frame 310 according to the embodiment shown in FIG. 3, may include electronic components or communication elements that transmit data and/or power to the adjacent pipe (e.g., 230, 240). These communication elements may include capacitive, resonant, or galvanic couplers, for example. When the device 210 or frame 310 includes a coupler on one side (adjacent to tubular member 230, for example) but does not include a second coupler on the opposite side (adjacent to tubular member 240, for example), the electronic components or communication elements must be secured to the device 210 or frame 310 to prevent rotation during the process of screwing together the tubular members 230, 240. Otherwise, the transmission line connecting the couplers may shear during the threading process when the shoulders of the threads make contact. A bolt, screw, or cogging, for example, may be used (screw 322 shown in FIG. 3).

Figure 4:
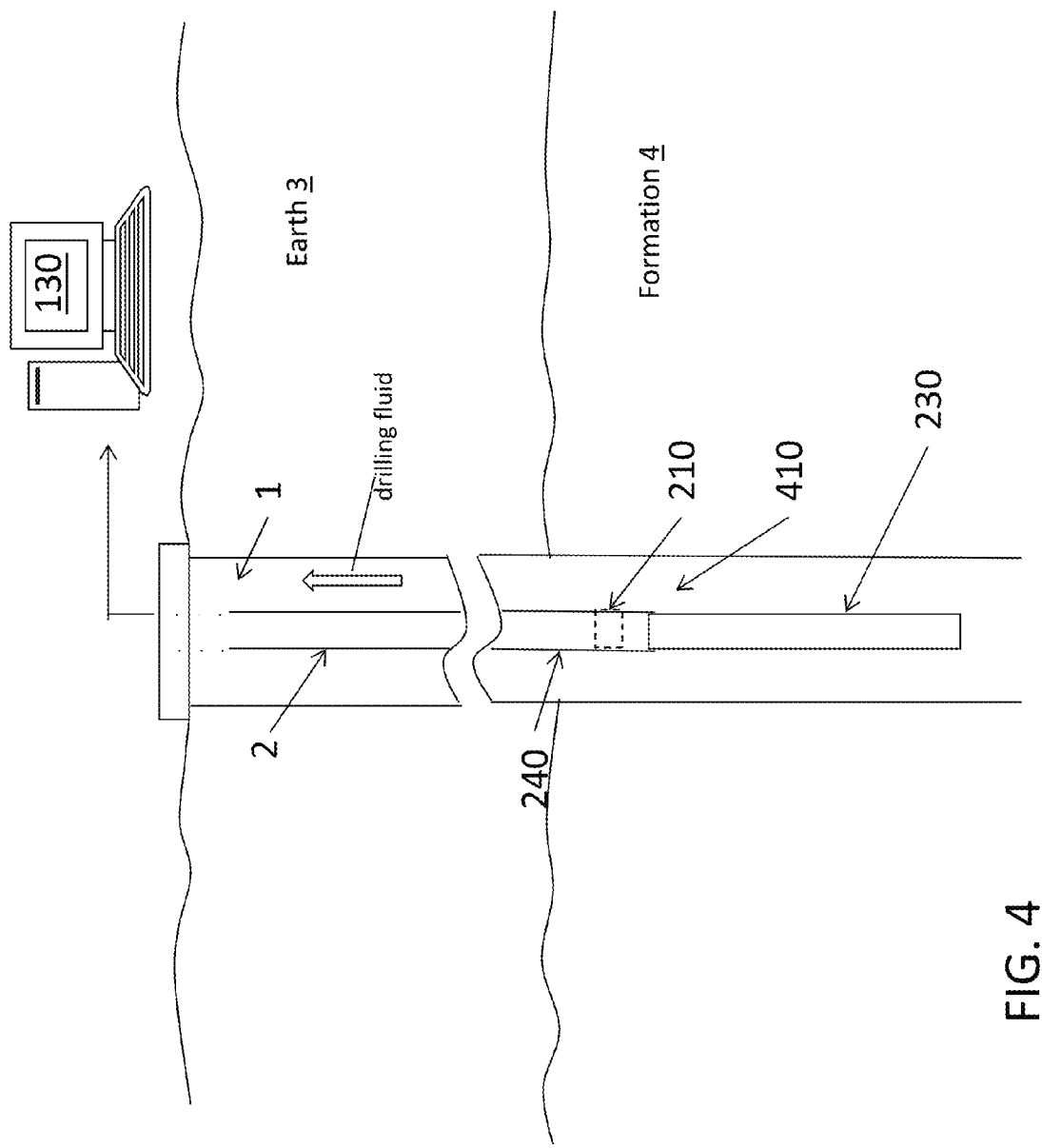
FIG. 4 is a cross-sectional illustration of a borehole including connected pipes according to an embodiment of the invention.

FIG. 4 is a cross-sectional illustration of a borehole 1 including connected tubular members 230, 240 according to an embodiment of the invention. A borehole 1 penetrates the earth 3 including a formation 4. The tubular members 230, 240 disposed in the borehole 1 are connected by a threaded portion (as shown in FIG. 3, for example) and form an annulus 410 with the borehole 1. A pressure equalization device 210 is between the tubular members 230, 240 as shown in the embodiments of FIG. 2 and FIG. 3, for example. Information from downhole sensors or measurement devices may be telemetered or transmitted to a surface processing device 130. The pressure equalization device 210 may include a cavity (e.g., 320 shown in FIG. 3) to house a transmission line or other components such as couplers, electronics, or batteries.

Figure 5:
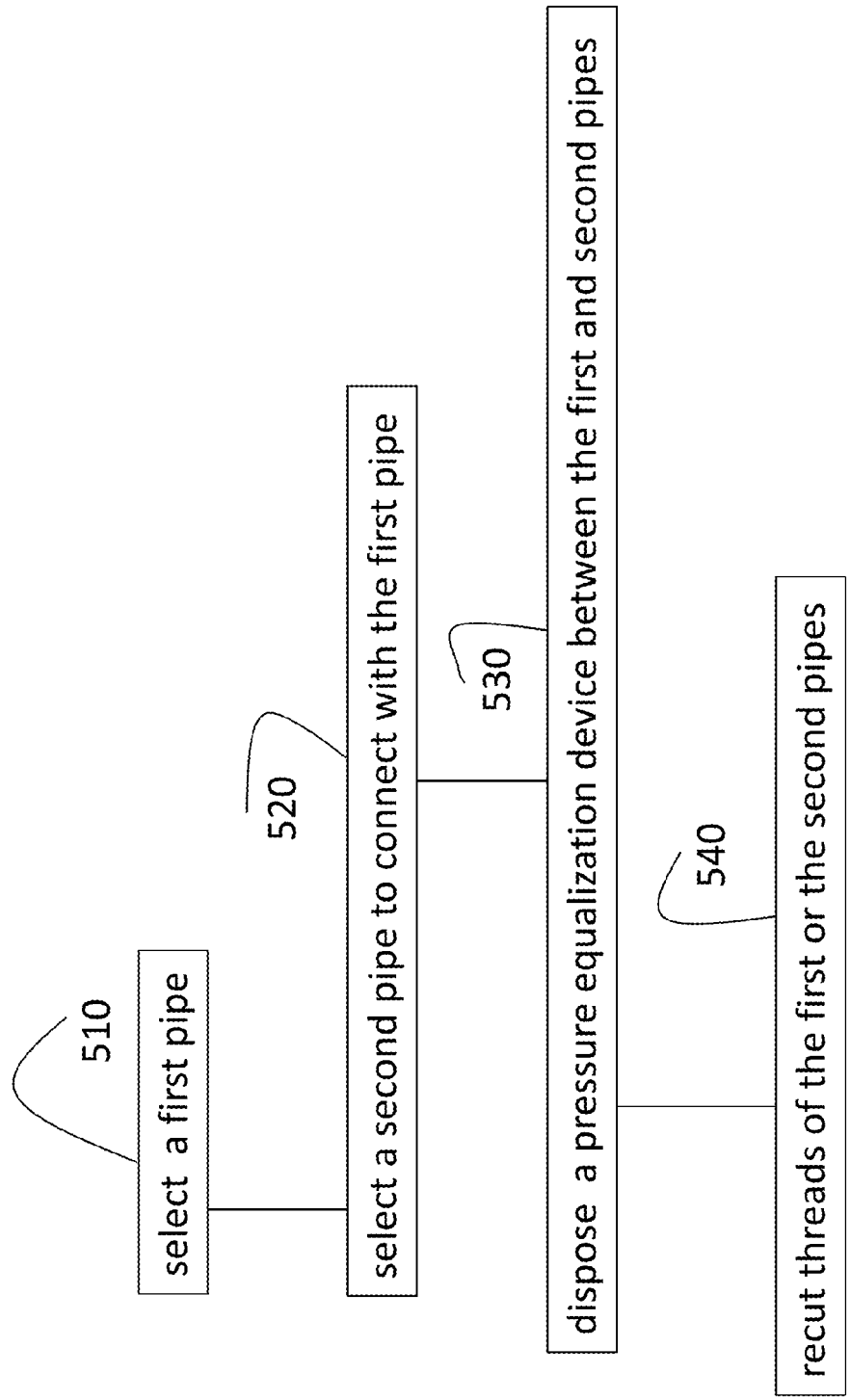
FIG. 5 is a flow diagram of an exemplary method of connecting pipes according to embodiments of the present invention.

FIG. 5 is a flow diagram of an exemplary method of connecting tubular members according to embodiments of the present invention. The method may be implemented for use in a downhole environment. The method includes selecting a first tubular member (e.g., 230) (block 510) that is made of a given material. The method also includes selecting a second tubular member (e.g., 240) to connect with the first tubular member 230 (block 520). The second tubular member 240 may be made of the same material as the first tubular member 230. At block 530, disposing a pressure equalization device between the first and second tubular members 230, 240 includes disposing a pressure equalization device 210 (310) with one or more openings 220 to equalize pressure between the interior 200 and the bore 250 or between the interior 202 and annulus 410 of the tubular members 230, 240. An opening 220 may be of any shape though a ring and tapered ring are shown at FIGS. 2 and 3. The material of the pressure equalization device 210 may be different than the material that makes up one or both of the tubular members 230, 240 and may be a stronger material. Recutting the threads and/or shoulders of the first or second tubular members 230, 240 (or both) (block 540) does not effect the pressure equalization device 210 or the opening 220.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A threaded tubular section, comprising:
 a first tubular member made of a first material, the first tubular member including a threaded pin section;
 a second tubular member made of a second material, the second tubular member including a threaded box section configured to mate with the threaded pin section;
 a pressure equalization device made of a third material and disposed between the first tubular member and the second tubular member, the pressure equalization device including one or more openings configured to equalize pressure in an interior of a thread connection of the first and the second tubular members with pressure in a bore or an annulus of the first and the second tubular members; and
 components within the pressure equalization device, wherein when the components include a coupler on a first side of the pressure equalization device adjacent to the first tubular member but not on a second side of the pressure equalization device adjacent to the second tubular member, the components are secured to the pressure equalization device to prevent rotation and shearing when the first tubular member is mated to the second tubular member.

2. The section according to claim 1, wherein when the threaded pin of the first tubular member and the threaded box of the second tubular member are recut, the pressure equalization device is not modified.

3. The section according to claim 1, wherein the first material and the second material are a same material.

4. The section according to claim 3, wherein the third material is different from the material of at least one of the first material and the second material.

5. The section according to claim 3, wherein the third material is a stronger or more resistant material than the material of at least one of the first material and the second material.

6. The section according to claim 1, wherein the pressure equalization device is a frame configured to house one or more electronic components.

7. The section according to claim 6, wherein the pressure equalization device includes a cavity to house components of a transmission line.

8. The section according to claim 7, wherein the components include at least one of a coupler, electronics, or batteries.

9. The section according to claim 1, wherein the first tubular member, the second tubular member, and the pressure equalization device are disposed in a borehole penetrating the earth.

10. A method of connecting tubular members in a borehole penetrating the earth, the method comprising:
 selecting a first tubular member made of a first material, the first tubular member including a threaded pin section;
 selecting a second tubular member made of a second material, the second tubular member including a threaded box section configured to mate with the threaded pin section;

disposing a pressure equalization device made of a third material between the first tubular member and the second tubular member, the pressure equalization device including one or more openings configured to equalize pressure in an interior of a thread connection of the first and the second tubular members with pressure in a bore or an annulus of the first and the second tubular members;

disposing components within the pressure equalization device; and comprising securing the components to the pressure equalization device when the components include a coupler on a first side of the pressure equalization device adjacent to the first tubular member but do not include a coupler on a second side of the pressure equalization device adjacent to the second tubular member.

11. The method according to claim 10, wherein the selecting the second tubular member includes the second material being the same material as the first material.

12. The method according to claim 10, wherein the disposing the pressure equalization device includes the third material being a different stronger or more resistant material than at least one of the first material or the second material.

13. The method according to claim 10, the disposing the pressure equalization device includes disposing a frame configured to house one or more electronic components.

14. The method according to claim 10, further comprising recutting the threaded pin section or the threaded box section including their shoulders, wherein the pressure equalization device is unchanged in the recutting.

* * * * *